United States Patent
Manning et al.

(10) Patent No.: US 12,022,005 B2
(45) Date of Patent: *Jun. 25, 2024

(54) COMMIT SIGNING SERVICE

(71) Applicant: SNOWFLAKE INC., Bozeman, MT (US)

(72) Inventors: Mark M. Manning, Penfield, NY (US); Nathan A. Sfard, Belmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,673

(22) Filed: Jan. 27, 2023

(65) Prior Publication Data

US 2023/0275764 A1 Aug. 31, 2023

Related U.S. Application Data

(63) Continuation of application No. 17/652,842, filed on Feb. 28, 2022, now Pat. No. 11,632,251.

(51) Int. Cl.
| | |
|---|---|
| G06F 9/44 | (2018.01) |
| G06F 8/30 | (2018.01) |
| G06F 8/77 | (2018.01) |
| G06F 9/445 | (2018.01) |
| G06F 9/455 | (2018.01) |
| H04L 9/32 | (2006.01) |

(52) U.S. Cl.
CPC .............. *H04L 9/3247* (2013.01); *G06F 8/30* (2013.01); *G06F 8/77* (2013.01)

(58) Field of Classification Search
CPC ............. H04L 9/3247; G06F 8/30; G06F 8/77
See application file for complete search history.

(56) References Cited

U.S. PATENT DOCUMENTS

| | | | |
|---|---|---|---|
| 9,887,975 B1* | 2/2018 | Gifford | ............ H04W 12/0431 |
| 10,805,087 B1* | 10/2020 | Allen | ..................... G06F 21/57 |
| 11,025,598 B1* | 6/2021 | Laghaeian | .......... H04L 63/0435 |
| 11,057,215 B1 | 7/2021 | Miller | |

(Continued)

FOREIGN PATENT DOCUMENTS

| | | | | |
|---|---|---|---|---|
| CN | 109814889 A | | 5/2019 | |
| CN | 109313685 B | * | 6/2021 | ............. G06F 21/51 |
| CN | 113886894 A | | 1/2022 | |

OTHER PUBLICATIONS

Seth Falco, What is Commit Signing in Git, Jun. 2021, pp. 1-19. https://www.freecodecamp.org/news/what-is-commit-signing-in-git/ (Year: 2021).*

(Continued)

*Primary Examiner* — Mongbao Nguyen
(74) *Attorney, Agent, or Firm* — Womble Bond Dickinson (US) LLP

(57) ABSTRACT

Signing source code using a vault device is described. An example method can include receiving, with a client device, source code that is to be committed to a repository. The method further can include sending, with a processing device to a vault device, a request to sign the source code. The method can further include receiving, from the vault device, a signed commit of the source code. In addition, the method can include pushing the source code and the signed commit to the repository, wherein the repository commits the source code and signed commit.

25 Claims, 9 Drawing Sheets

(56) References Cited

U.S. PATENT DOCUMENTS

| | | | |
|---|---|---|---|
| 11,328,065 B1 | 5/2022 | Wall et al. | |
| 11,379,215 B1* | 7/2022 | Jayakumar | H04L 9/3265 |
| 11,477,183 B1* | 10/2022 | Brandwine | H04L 63/0838 |
| 11,507,355 B2* | 11/2022 | McKay | H04L 9/0643 |
| 2015/0188945 A1* | 7/2015 | Kjeldaas | G06F 21/6245 |
| | | | 726/1 |
| 2016/0365983 A1 | 12/2016 | Shahabuddin et al. | |
| 2017/0085532 A1 | 3/2017 | Chan et al. | |
| 2018/0198629 A1 | 7/2018 | Deymonnaz et al. | |
| 2019/0034919 A1* | 1/2019 | Nolan | G06Q 20/36 |
| 2019/0205121 A1 | 7/2019 | Ericson | |
| 2019/0268164 A1* | 8/2019 | Rossetti | H04L 67/1097 |
| 2019/0288850 A1* | 9/2019 | Beecham | G06F 21/6209 |
| 2019/0303579 A1 | 10/2019 | Reddy et al. | |
| 2019/0303623 A1* | 10/2019 | Reddy | G06F 8/71 |
| 2019/0305957 A1 | 10/2019 | Reddy et al. | |
| 2019/0312734 A1* | 10/2019 | Wentz | H04L 9/3239 |
| 2020/0067907 A1* | 2/2020 | Avetisov | H04L 63/12 |
| 2020/0084044 A1* | 3/2020 | Dasen | H04L 9/0894 |
| 2020/0133658 A1* | 4/2020 | Agrawal | H04L 9/50 |
| 2020/0151319 A1* | 5/2020 | Sharma | H04W 12/084 |
| 2021/0006402 A1 | 1/2021 | Ohms et al. | |
| 2021/0044976 A1* | 2/2021 | Avetisov | H04L 63/0815 |
| 2021/0056209 A1* | 2/2021 | Fox | G06F 21/57 |
| 2021/0184864 A1* | 6/2021 | Wentz | H04L 9/3073 |
| 2021/0216636 A1* | 7/2021 | Devries | G06F 8/65 |
| 2022/0094551 A1* | 3/2022 | Burt | G06F 11/36 |
| 2023/0088197 A1* | 3/2023 | Cline | G06F 21/57 |
| | | | 713/187 |
| 2023/0169215 A1* | 6/2023 | Bowie | G06F 8/10 |
| | | | 713/176 |
| 2023/0239160 A1* | 7/2023 | Sonawane | H04L 9/3247 |
| | | | 713/176 |
| 2023/0246845 A1* | 8/2023 | Peddada | H04L 9/3247 |
| | | | 713/176 |

OTHER PUBLICATIONS

Seth Falco, What is Commit Signing in Git?, 2021, pp. 1-19. https://www.freecodecamp.org/news/what-is-commit-signing-in-git/#:~:text=Signing%2C%20or%20code%20signing%20specifically,but%20digital%20and%20more%20reliable. (Year: 2021).*

Ethan Rahn, Commit Signing with Git at Enterprise Scale, Jan. 2022, pp. 1-7. https://arista.my.site.com/AristaCommunity/s/article/commit-signing-with-git-at-enterprise-scale#Comm_Kna_ka08C0000008S9vQAE_81 (Year: 2022).*

Alina Bogdanova, Source Code Authorship Attribution using File Embeddings, 2021, pp. 1-3. https://dl.acm.org/doi/pdf/10.1145/3484271.3484981 (Year: 2021).*

Lyndsey Ferguson, Automate Code: Signing with Vault App Roles, 2021, pages https://careers.appian.com/blog/the-tech-corner/automate-code-signing-with-vault-app-roles/ (Year: 2021).*

Ievgeniia Kuzminykh, Analysis of Encryption Key Management Systems: Strengths, Weaknesses, Opportunities, Threats, 2020, pp. 515-520. https://ieeexplore.ieee.org/stamp/stamp.jsp?tp=&arnumber=9467909 (Year: 2020).*

Sangat Das, A Hyperledger Fabric Based Organizational Decentralized Access Control Solution, 2020, pp. 1-6. https://ieeexplore.ieee.org/stamp/stamp.jsp?tp=&arnumber=9484187 (Year: 2020).

Michael Lass, Confidentiality and Authenticity for Distributed Version Control Systems—A Mercurial Extension, 2016, pp. 1-9. https://ieeexplore.ieee.org/stamp/stamp.jsp?tp=&arnumber=7796756 (Year: 2016).

Katie Wah, Introducing code commit signing to secure your SDLC, 2021, pp. 1-6. https://www.beyondidentity.com/blog/introducing-code-commit-signing-secure-your-sdlc (Year: 2021).

Ann Yi Wong, Threat Modeling and Security Analysis of Containers: A Survey, 2021, pp. 1-31. https://arxiv.org/pdf/2111.11475.pdf (Year: 2021).

* cited by examiner

COMMIT SIGNING SERVICE

RELATED APPLICATIONS

This application is a continuation of co-pending U.S. patent application Ser. No. 17/652,842, filed Feb. 28, 2022, entitled "COMMIT SIGNING SERVICE," the disclosure of which is hereby incorporated by reference in its entirety.

TECHNICAL FIELD

The present disclosure relates to data processing and, in particular, to a commit signing service that prevents unauthorized parties from injecting code into a product.

BACKGROUND

Developers of source code and executables will typically use a source code control system to manage changes to components of a program, documents, web sites, or other collections of information. A developer will typically check out a source code file, edit the source code file, and commit the edited source code file back to a repository of the source code control system. A developer can additionally use a signing key to sign the committed source code so that the changes to the source code can be identified to that developer.

A problem with a developer signing the source code commits is that the management of the signing keys is left to the developer and leaves little or no control for a company to manage or control the signing keys. This is because the company does not have a way to control the signing keys and who uses the signing keys if the signing keys are resident on a developer's device. For example, a developer may leave the company and take the signing keys with them, which would allow them to still sign the commit source code. Alternatively, a developer's account to the source code system can be hacked and a new signing key can be uploaded, which would result in the hacker's commits being signed with a legitimate signing key. The acquired signing key could then be used by a third party to install source code that can add a backdoor into the program, cause the system to fail, or other nefarious purposes.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In the described systems and methods, a system for enabling secure commits of source code to a repository with vault device to manage the signing keys is described. Developers of source code and executables will typically use a source code control system to manage changes to components of a program, documents, web sites, or other collections of information. A developer will typically check out a source code file, edit the source code file, and commit the edited source code file back to a repository of the source code control system. A developer can additionally use a signing key to sign the committed source code so that the changes to the source code can be identified to that developer.

A problem with a developer signing the source code commits is that the management of the signing keys is left to the developer and leaves little or no control for a company to manage or control the signing keys. This is because the company does not have a way to control the signing keys and who uses the signing keys if the signing keys are resident on a developer's device. For example, a developer may leave the company and take the signing keys with them, which would allow them to still sign the commit source code. Alternatively, a third party may acquire the signing keys so as to use these signing keys to fraudulently sign and commit the source code. The acquired signing key could then be used by a third party to install source code that can add a backdoor into the program, cause the system to fail, or other nefarious purposes.

In one embodiment, in order to have more control over the management of the signing keys, a vault device is used to store and maintain the signing keys and also to use these signing keys to sign a commit of the source code before the signed commit is sent to the repository. In this embodiment, by using the vault device to manage the signing keys, the risk of a malicious use of the signing keys is reduced because the signing keys are managed by an administrator of the vault device, not the individual developers. In one embodiment, the vault device stores the signing keys for the developer and these signing keys do not leave the vault device. Instead of the client device signing the source code, the vault device signs the source code and sends the commit signature back to the client device. In one embodiment, the vault device can use an identity provider that is used to provide the identity credentials of the developer. In this embodiment, if the client device does not include the developer credentials in the signing code request, the vault device can request the developer credentials. The client device can commit the source code and the commit signature to the repository. In this embodiment, by storing the source code and commit signature in the repository, the source code can be verified using the commit signature with the vault device.

Figure 1:
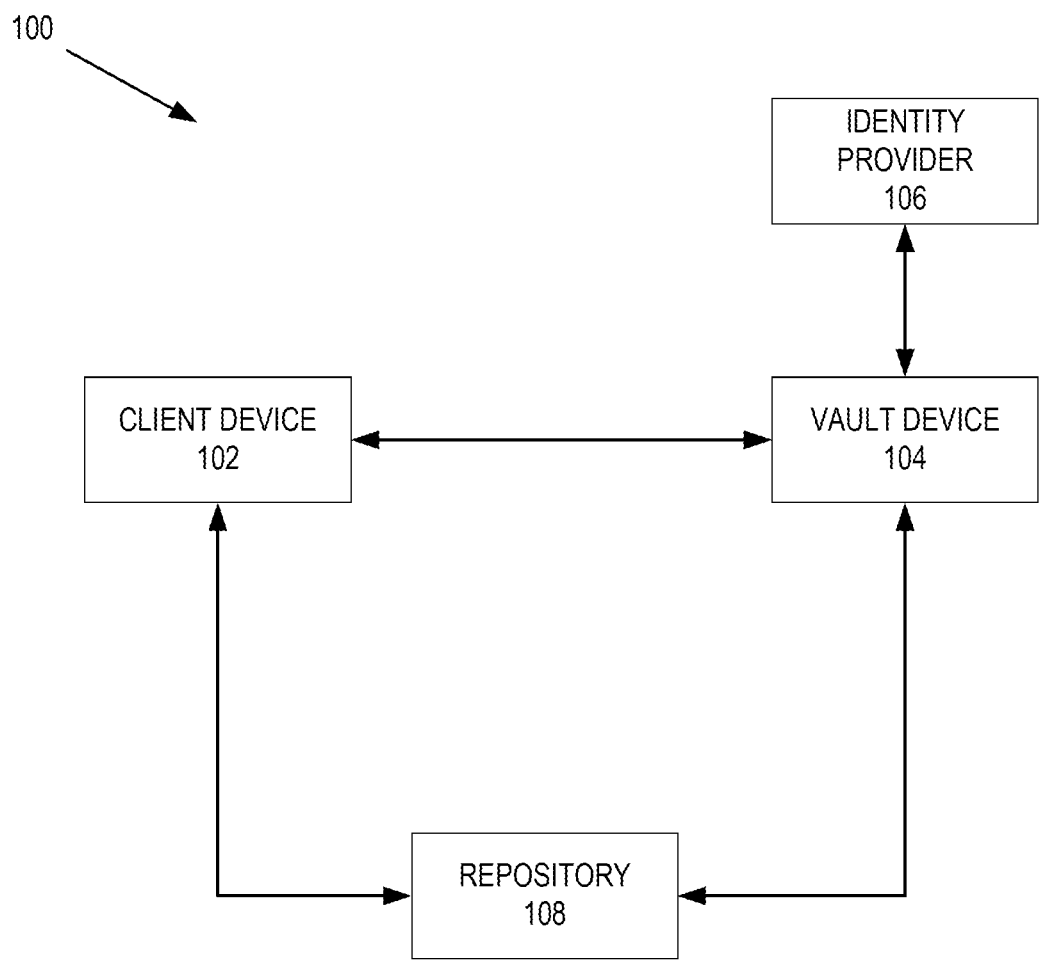
FIG. 1 is a block diagram depicting a system that enables secure commits of source code.

FIG. 1 is a block diagram depicting a system that enables secure commits of source code. In FIG. 1, the system 100 includes a client device 102, vault device 104, identity provider 106, and repository 108. In one embodiment, the client device is a device that is used to develop software that can include an integrated development environment (IDE). In this embodiment, a software developer would use the client device 102 to develop software by writing source code, compiling or running the source code, and interpreting the results. The software developer can use a source code repository to manage changes to the source code, for example by using a version control system. In one embodiment, the repository 108 includes a repository for storing and managing source code. In one embodiment, source code can include a programming file (e.g., a file used to compile and/or run a program), build file, header file, audio/visual file, and/or any other type of file used in a software building process. In addition, the vault device 104 is used to store signing keys for the source code. In one embodiment, a signing key is used to digitally sign the source code. In this embodiment, instead of the signing keys being on the client device 102, the software developer would submit the source code to the vault device 104, where the vault device 104 signs the source code to create a commit signature and returns the commit signature to the client device 102. In this embodiment, by having the vault device 104 sign the source code instead of the client device 102, the signing key never leaves the trusted vault device 104 and has less opportunity for exposure to malicious parties. While in one embodiment, the vault device 104 is a physical device, in alternative embodiments, the vault device 104 can be a software, a tool, or a system that manages encryption and secrets.

In one embodiment, if the signing keys are kept on a client device 102, then these keys can be used by a developer on the client device 102, used by another developer on this device 102 or another device. In addition, if the developer leaves their current company (e.g., the one that issued the signing key), the developer (or someone else) can maliciously inject signed code into the repository. Because this signed source code is now in the repository and signed with a valid signing key, this source code appears authentic and this signed source code can enter a software build. However, by using vault device 104 to manage the signing keys, the risk of an unauthorized use of the signing key is reduced and possibly eliminated. In one embodiment, when the client device 102 requests a signed commit signature, the client device 102 sends the payload to be signed, such as the commit source code. In this embodiment, the vault device 104 uses the developer's name and timestamp to sign the commit, but this is not included in the request sent to vault device 104 since the vault device 104 has the information used for the signing (e.g. the developer username can be retrieved from the login and the timestamp is determined at time of request). In one embodiment, the vault device 104 stores the signing keys for the developer and these signing keys do not leave the vault device. Instead of the client device 102 signing the source code, the vault device 104 signs the source code and sends the commit signature back to client device 102. In one embodiment, the vault device 104 can use an identity provider 106 that is used to provide the identity credentials of the developer. In this embodiment, if the client device 102 does not include the developer credentials in the signing code request, the vault device 104 can request the developer credentials. The client device 102 can commit the source code and the commit signature to the repository 108. In this embodiment, by storing the source code and commit signature in the repository 108, the source code can be verified using the commit signature with the vault device 104. In one embodiment, the client device 102 sends the signed commit and the commit signature to the repository 108. In this embodiment, the signed commit itself also includes the name of the committer and the timestamp. If this information in the commit is different from the corresponding information in the signature, then a verification of this commit will fail. For example, and in one embodiment, if the developer puts a false name in the commit and then signs with the signing key, verification will check the signature using the false name's signing key and the verification will fail. The secure commit is further described in FIG. 2 below.

Figure 2:
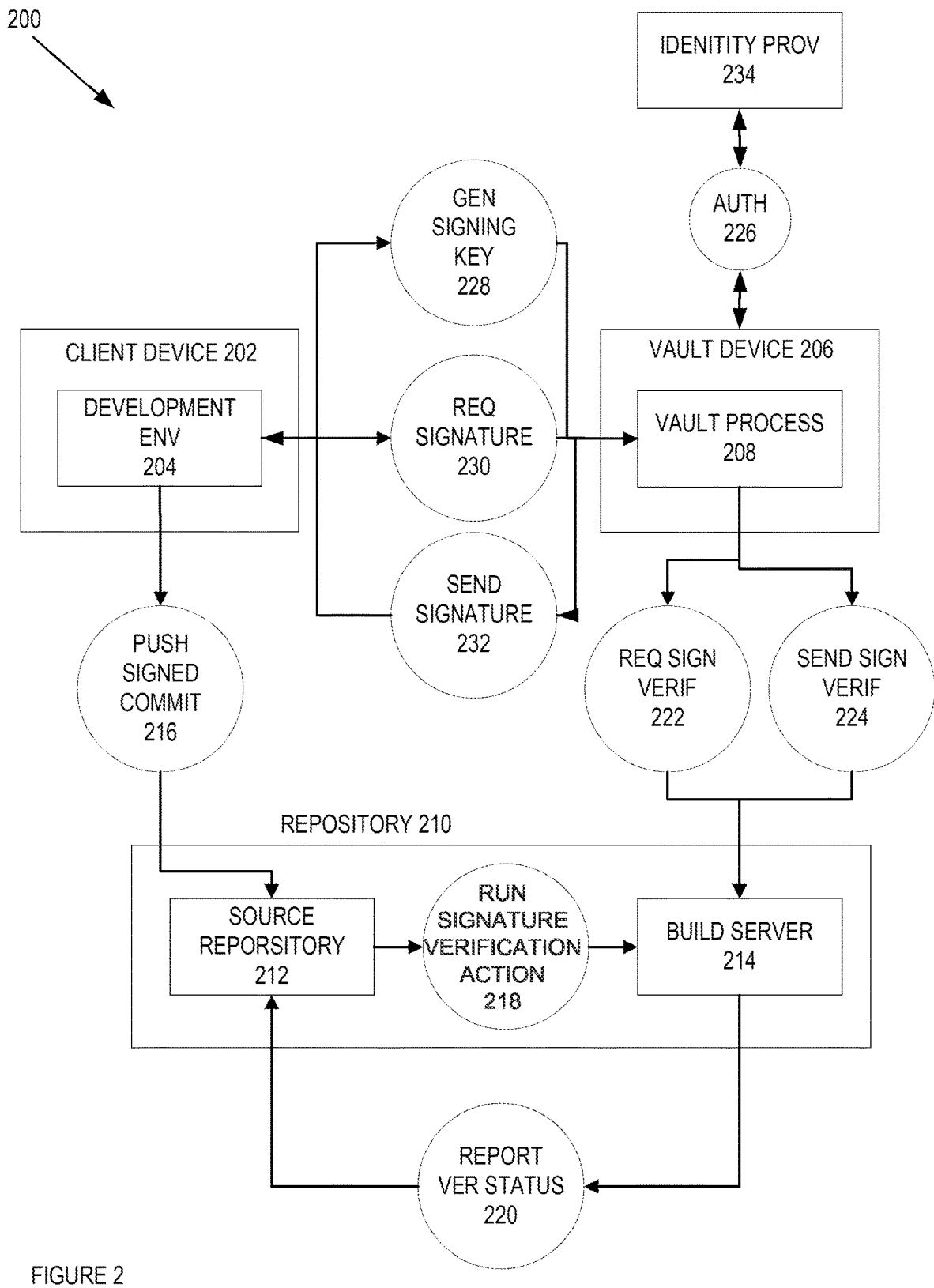
FIG. 2 is a block diagram of one embodiment of secure commit of source code.

FIG. 2 is a block diagram of one embodiment of a system 200 for a secure commit of source code. In FIG. 2, the system 200 includes a client device 202 coupled to the vault device 206 and a repository 210. Furthermore, the vault device 206 is coupled to the repository 210 and the identity provider 234. In one embodiment, the client device 202 is a device that a developer uses to develop source code and commit the source code to the repository 210. In this embodiment, client device 202 includes a development environment 204 that the developer uses to develop the source code. For example, and in one embodiment, the development environment can be an integrated development environment that can include a source code editor, build automation tools, debugger, and/or other tools that the developer can use to develop the source code. In one embodiment, in order to securely commit the source code to the repository 210, the developer will sign the source code using the vault device 206. In this embodiment, if the signing key for the developer has not been assigned, the developer requests a signature key (228) and the vault device 206 generates the signing key. In this embodiment, the vault device 206 generates and stores the signing keys instead of returning the signing keys to the developer. By storing the signing keys with the vault device 206 instead of returning the signing keys to the client 202, a company can use the vault device 202 to manage the signing keys more effectively than having the signing keys managed by the individual developer. For example, and in one embodiment, by having the signing keys managed with the vault device 204, a signing key can be invalidated or rotated if a developer leaves the company or has their signing key exposed, respectively. In contrast, by having the signing keys managed by the developer, a company has less control on the managing the signing keys, because a company cannot easily invalidate, rotate, or delete a signing key, especially if a third party gets ahold of the signing key. In one embodiment, the developer performs a one-time setup to set their commit signing program If the developer has generated a signature key that is held by the vault device 206, the developer can request a signature for source code (230) from the vault device. In one embodiment, the developer performs a commit using the source code that checks dependencies, logs into the vault device 206 and generates a signing key (if not available). The vault device 206 invokes a signing function to produce a commit signature for the source code, where the client device 202 receives the commit signature. With the commit signature, the developer can push the signed commit to the source repository 212 in the repository 210. In one embodiment, a signed commit is source code that includes a cryptographic signature. In one embodiment, the signed commit includes a tree object hash (which can be used to retrieve the changes made in the commit), author of the commit, and time of the commit. In this embodiment, when vault device 206 signs a commit, the vault device 206 signs the object described above and includes that signature as part of the commit request. In one embodiment, the vault device 206 includes a vault process 208 that can generate the signing key (228), receive a request for a commit signature (230), and send the commit signature (232) to the client 202. In addition, the vault device 206 requests an authorization (226) from the identity provider 234 using a set of credentials transmitted by the developer from the client device 202. In this embodiment, the identity provider 234 is a system entity that creates, maintains, and manages identity information for principals and can provide authentication services to relying applications within a network. For example, and in one embodiment, an identity provider 234 can be an IndieAuth, OpenID, Security Assertion Markup Language, or another type of identity provider. If the identity provider 234 authenticates the developer using the developer credentials, the identity provider 234 sends an indication to the vault device 206 that the developer is authenticated. In one embodiment, with the received authentication, the vault device 206 generates the signing key and sends an indication to the client that the signing key was generated (228).

In addition to generating signing keys and signing source code using those keys, the vault device 206 can use the signing keys to verify a source code signature stored in the repository. In this embodiment, the signature verification (218) is performed in response to a pull request for that source code. In one embodiment, a pull request is a mechanism for a developer to propose changes to the main (standard) branch of a repository. If the pull request is approved, the changes are merged into the main branch. Typically, repositories are set up so changes can be made to the main branch if they are done so as a pull request. In one embodiment, the developer opens a pull request in the repository, where a build server 214 is invoked to run a custom verification action 222. In this embodiment, the verification action verifies each commit in the pull request by logging into the vault device 206 to get the username associated with the developer that created or edited the source code. In addition, the vault device 206 invokes a verification function to verify each commit signature against the developer's signing key that is stored in the vault. The vault device 206 returns the verification status back to the repository (224). The build server 214 further returns the verification status back to the source repository as a check status (220).

Figure 3:
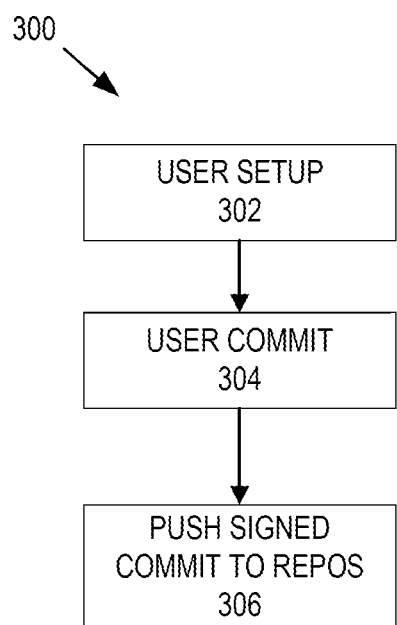
FIG. 3 is a flow diagram of one embodiment of a method to push a signed commit to a repository.

As per above, the vault device 206 retains the signing keys and the client device 202 makes a request to sign the commits. This arrangement allows a company to manage the signing keys stored on the vault device 206. For example, and in one embodiment, if a developer leaves the company or no longer works on a development project, the signing key for that developer can be deactivated. By having the signing keys resident on the vault device, if the developer leaves, the signing key cannot follow the developer. In addition, by securing the signing key on the vault device 206, it is more difficult for a third-party to acquire the signing key. FIG. 3 is a flow diagram of one embodiment of a method 300 to push a signed commit to a repository. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the client device 102. Method 300 may begin at step 302, where the processing logic performs a user setup at step 302. In one embodiment, the user setup is to set up the commit signing process on the client, such as client device 102 as described in FIG. 1 above. At step 304, processing logic performs a user commit. In one embodiment, a user commit occurs when a developer pushes source code to a source code repository, such as for committing source code that has been edited, created, or otherwise changed. In this embodiment, as part of the user commit, the source code being committed is signed using a signing key associated with the developer performing the commit. Signing the source code is further described in FIG. 4 below. Processing logic pushes the signed user commit to the repository at step 306. In one embodiment, processing logic signals to the repository that the source code is committed, where the repository takes steps to commit the source code.

Figure 4:
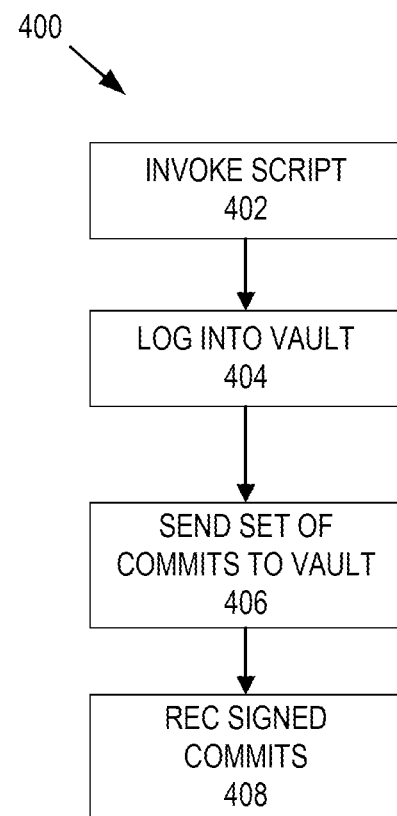
FIG. 4 is a flow diagram of one embodiment of a method to generate a signed commit for a pull request.

FIG. 4 is a flow diagram of one embodiment of a method 400 to generate a signed commit. In general, the method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the client device 102. Method 400 may begin at step 402, processing logic invokes a script that is used to check dependencies for the target source code. In one embodiment, source code can be dependent on other files. For example, and in one embodiment, a source code file may be dependent on a header or a library. If either of the header or library has changed and the source code file has changed, then the source code and the changed dependent files will need to be committed as well. Checking dependencies can result in one or more commits that can occur. For example, and in one embodiment, when using third party libraries/dependencies, a developer may not commit the updated libraries to source code. Instead, the developer would update a version number in a Software Bill of Materials file (as a source code commit) and the build system will pull in the library or dependency at build time, where the build time is after commit time. With the set of source code commits determined, processing logic logs into the vault device at step 404. At step 406, processing logic sends the set of commits to the vault device. In one embodiment, the set of commits are sent to the vault device where the vault device signs each of the commits and returns the signed commits. Processing logic receives the set of signed commits at step 408.

Figure 5:
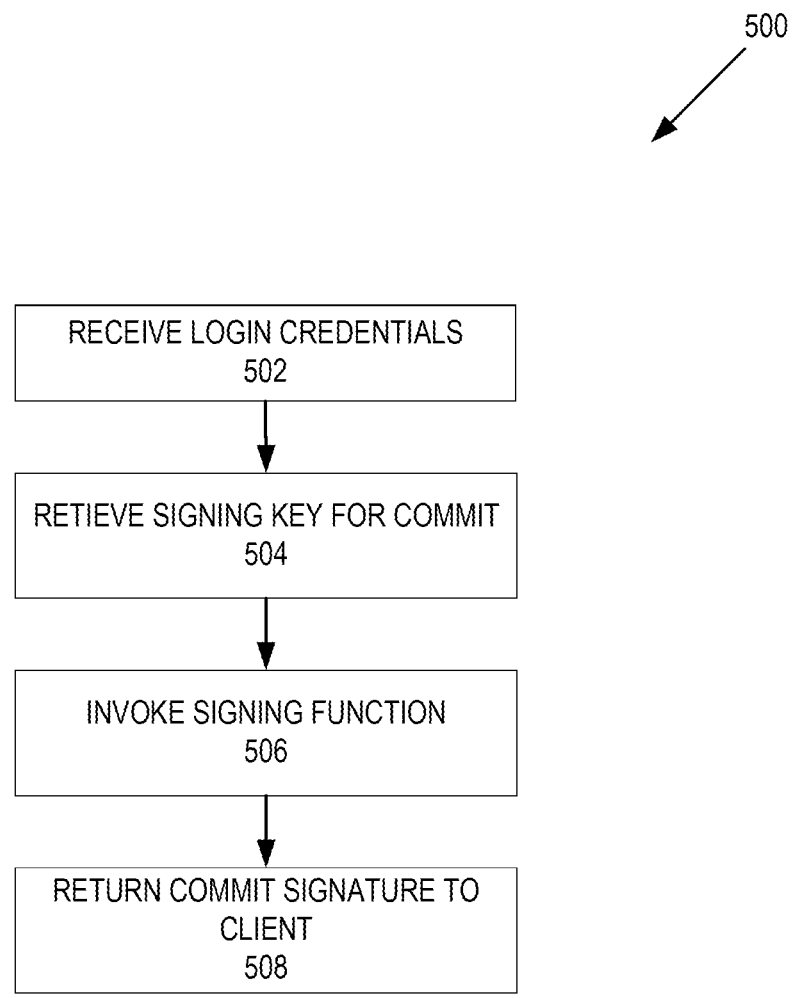
FIG. 5 is a flow diagram of one embodiment of a method to generate a commit signature.

In one embodiment, the vault device performs the actual process of signing a commit. FIG. 5 is a flow diagram of one embodiment of a method 500 to generate a commit signature. In general, the method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the vault device 104. Method 500 may begin at step 502, where processing logic receives the login credentials of the developer. In one embodiment, the login credentials can be username and password, security token, special token, and/or another type of login credentials that identifies a developer to the vault device. Processing logic retrieves a signing key if needed at step 504. In one embodiment, if there is not a signing key for the developer stored, processing logic generates the signing key. If a signing key is stored or available for the developer, a signing key is not needed to be generated. If there is a signing key available for the developer, processing logic retrieves the signing key. Processing logic invokes a signing function at step 506. In one embodiment, there is a signing endpoint on the vault server for each signing key. A client just sends a request to a specific endpoint with a payload to be signed with that endpoint's signing key and processing logic invokes the signing function. At step 508, processing logic returns the signed commit to the requesting client.

Figure 6:
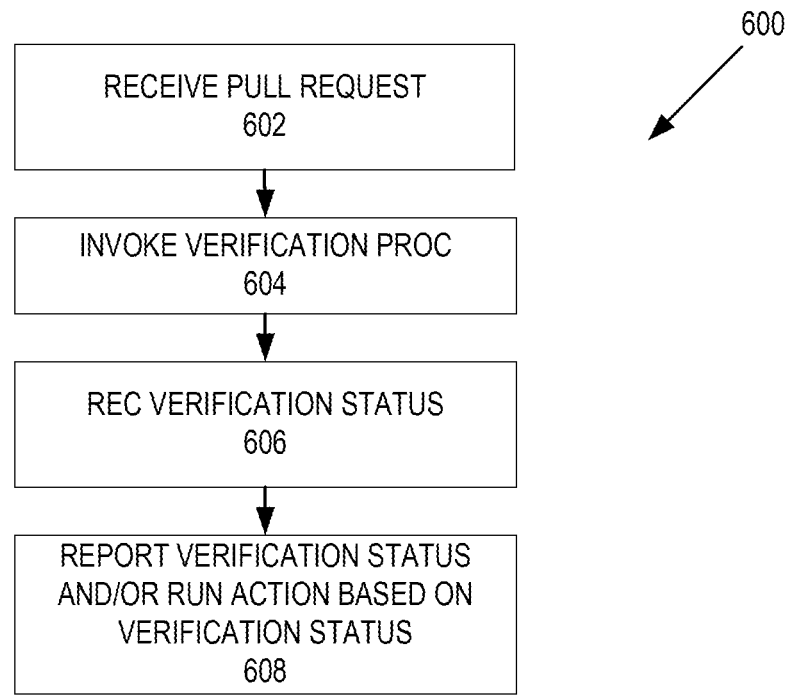
FIG. 6 is a flow diagram of one embodiment of a method to verify a commit signature.

In one embodiment, a pull request is used by a developer to let others know about changes the developer has published in a repository. FIG. 6 is a flow diagram of one embodiment of a method 600 to verify a commit signature for a pull request. In general, the method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the repository 108. Method 600 may begin at step 602, where processing logic receives a pull request. In one embodiment, a pull request is a mechanism for a developer to propose changes to the main (standard) branch of a repository. If the pull request is approved, the changes are merged into the main branch. Typically, repositories are set up so changes can only be made to the main branch if they are done so as a pull request. At step 604, processing logic invokes a verification process. In one embodiment, verification is performed by comparing the commit signature for the source with a generated signature. Verification is further described in FIG. 7 below. Processing logic receives the verification status at step 606. In one embodiment, the verification status can include whether each source code in the pull request is verified. Processing logic reports verification status and/or runs an action based on the verification status at step 608.

Figure 7:
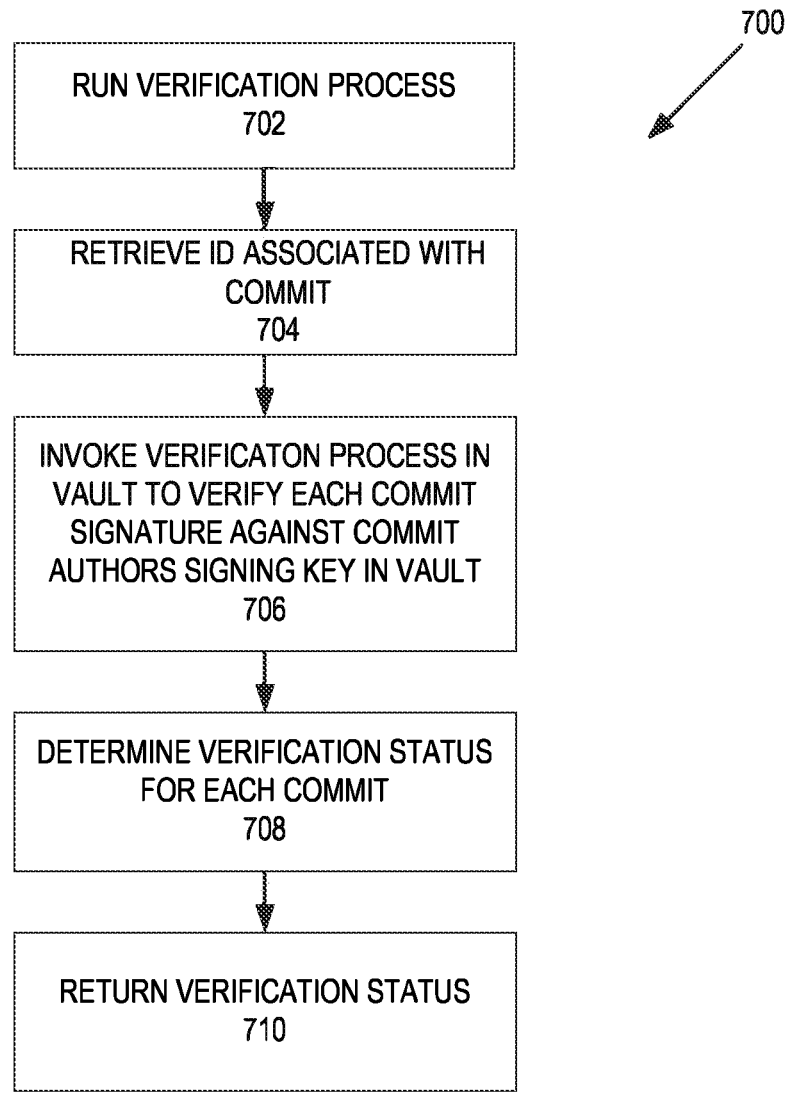
FIG. 7 is a flow diagram of one embodiment of a method to determine verification.

FIG. 7 is a flow diagram of one embodiment of a method 700 to determine a verification. In general, the method 700 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the vault device 104. Method 700 may begin at step 702, where processing logic receives a verification request. In one embodiment, the verification request includes the source code involved in the verification request, developer username associated with the verification request, and a commit signature. At step 704, processing logic retrieves an identity associated with the commit. In one embodiment, the identity associated with the commit is in the commit object itself. In this embodiment, processing logic retrieves the identity from the commit object. Processing logic invokes a verification process in the vault device to verify each commit signature against the commit authors signing key stored in the vault device at step 706. In one embodiment, the verification process computes a local commit signature using the commit authors signing key and the received commit signature. Processing logic determines a verification status for each commit at step 708. If the commit signatures are the same, the verification process for that commit signature passes, otherwise it does not. At step 710, processing logic returns the verification status.

Figure 8:
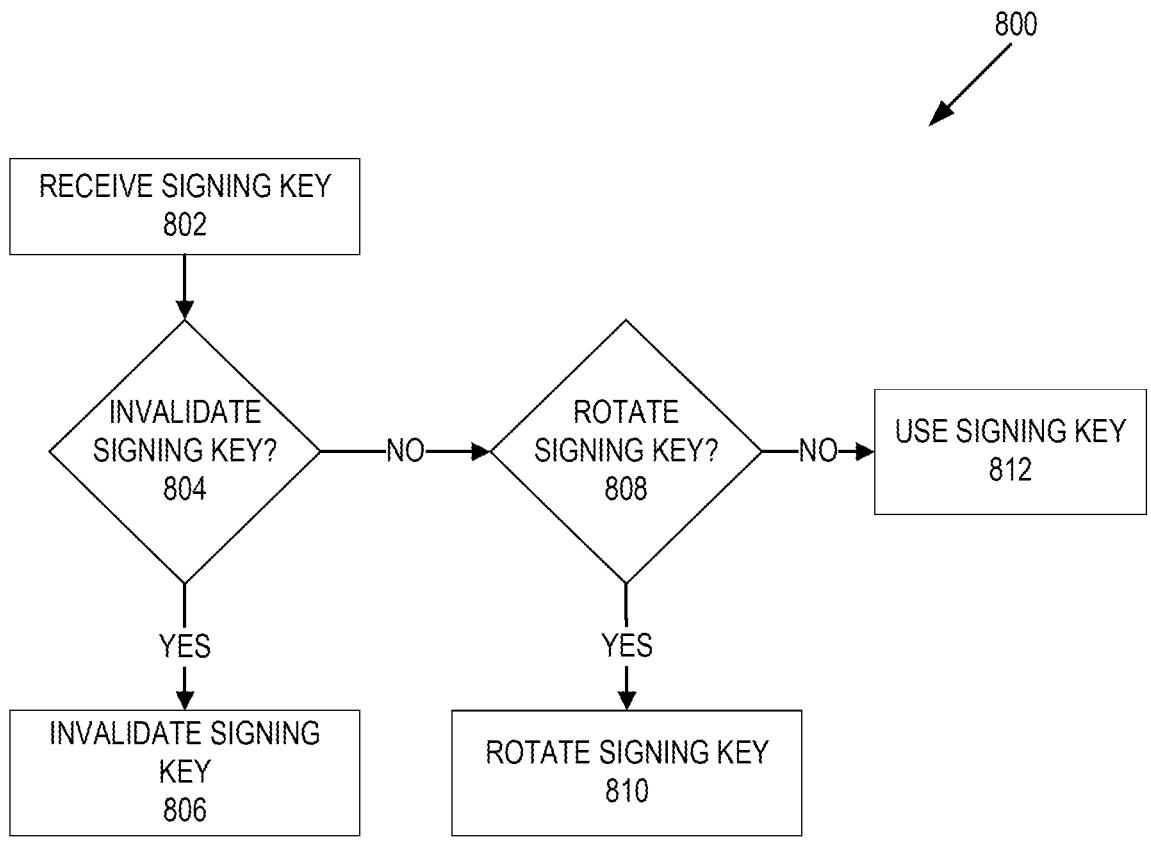
FIG. 8 is a flow diagram of one embodiment of a method to manage signing keys.

In one embodiment, because the vault device keeps the signing keys resident on this device, the vault device can be used to manage the signing keys. In this embodiment, the vault device can be used to invalidate a signing key if the developer leaves the company or project, or if the signing key becomes compromised. Alternatively, the vault device can be used to rotate signing keys FIG. 8 is a flow diagram of one embodiment of a method to manage signing keys. In general, the method 800 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. For example, the processing logic may be implemented as the vault device 104. Method 800 may begin at step 802, where processing logic receives a signing key. Processing logic determines if a signing key should be invalidated at step 804. In one embodiment, processing logic can determine that a signing key should be invalidated because the signing key is associated with a developer that has left the company or project. If the signing key is to be invalidated, processing logic invalidates the signing key at step 806.

If the signing key is not to be invalidated, processing logic determines if the signing key is to be rotated at step 808. In one embodiment, the signing key can be rotated after an expiration of a time period. If the signing key is to be rotated, processing logic rotates the signing key at step 810. If not, prosecution proceeds to step 812, where the signing key is used to sign a commit.

Figure 9:
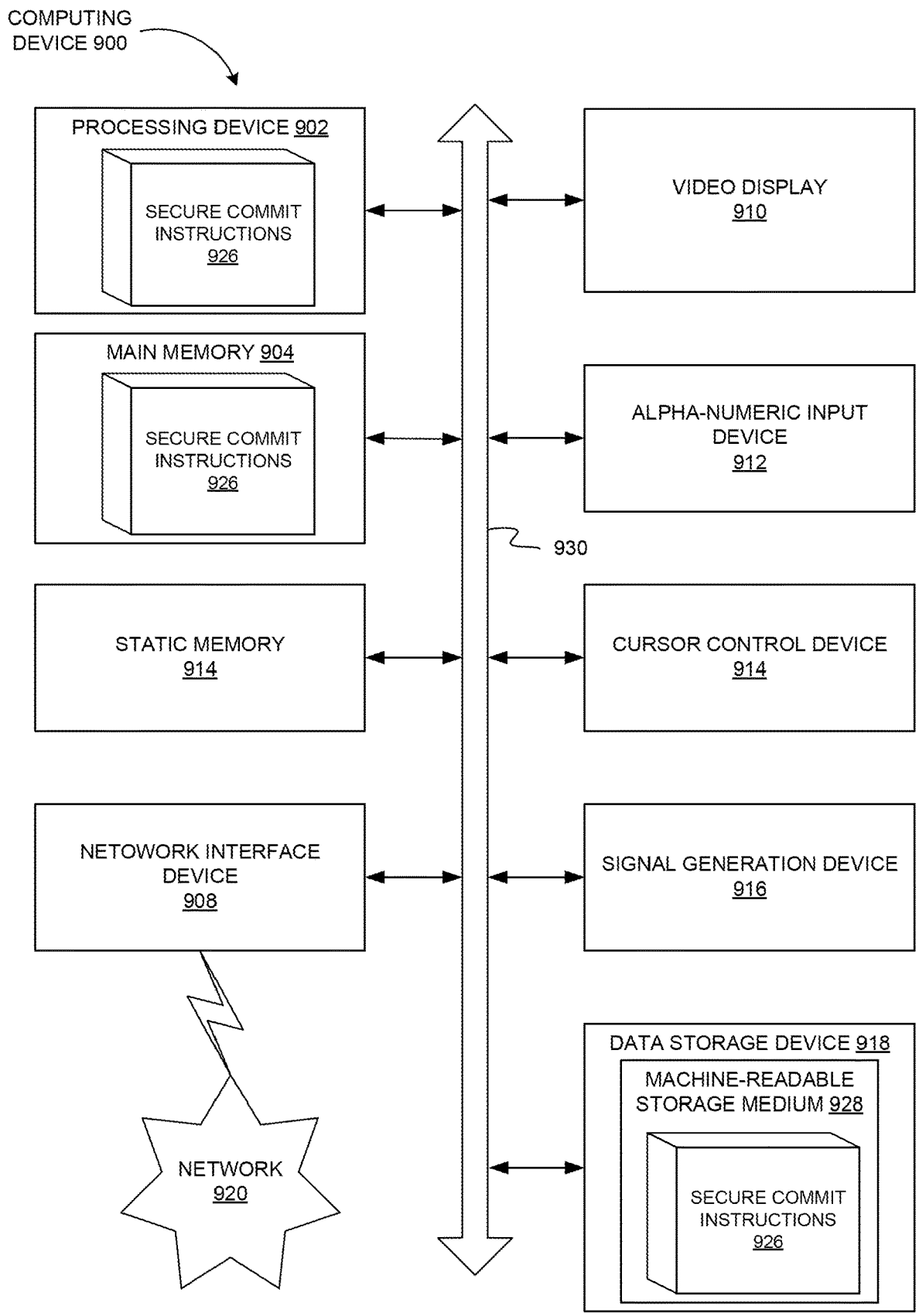
FIG. 9 is a block diagram of an example computing device that may perform one or more of the operations described herein, in accordance with some embodiments.

FIG. 9 is a block diagram of an example computing device 900 that may perform one or more of the operations described herein, in accordance with some embodiments. Computing device 900 may be connected to other computing devices in a LAN, an intranet, an extranet, and/or the Internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 914), which may communicate with each other via a bus 830.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein. In one embodiment, processing device 902 represents client device 102, vault device 104, and/or repository 106 of FIG. 1.

Computing device 900 may further include a network interface device 908 which may communicate with a network 920. The computing device 900 also may include a video display unit 914 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 914, alphanumeric input device 912, and cursor control device 914 may be combined into a single component or device (e.g., an LCD touch screen).

Data storage device 918 may include a computer-readable storage medium 928 on which may be stored one or more sets of instructions, e.g., instructions for carrying out the operations described herein, in accordance with one or more aspects of the present disclosure. Secure commit instructions 926 may also reside, completely or at least partially, within main memory 904 and/or within processing device 902 during execution thereof by computing device 900, main memory 904 and processing device 902 also constituting computer-readable media. The instructions may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 10:
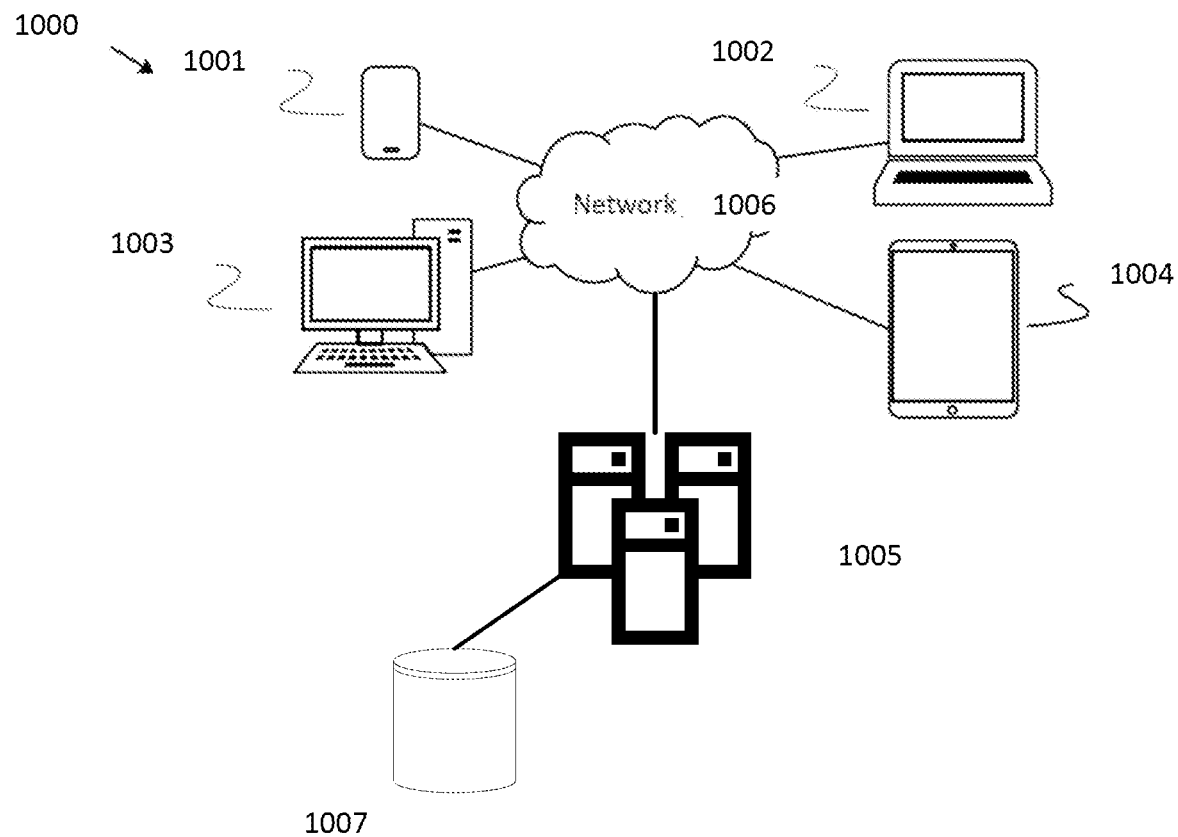
FIG. 10 is a block diagram of an example network that may perform one or more of the operations described herein, in accordance with some embodiments.

As illustrated in FIG. 10, the system 1000 includes computing devices 1001, 1002, 1003, 1004, and 1005. In one embodiment, the computing devices 1001-1005 can be a smartphone or tablet, laptop, personal computer, server, or cluster. The computing devices 1001, 1002, 1003, 1004, and 1005 may be coupled to each other (e.g., may be operatively coupled, communicatively coupled, may communicate data/messages with each other) via network 1006. Network 1006 may be a public network (e.g., the internet), a private network (e.g., a local area network (LAN) or wide area network (WAN)), or a combination thereof. In one embodiment, network 1006 may include a wired or a wireless infrastructure, which may be provided by one or more wireless communications systems, such as a WiFi™ hotspot connected with the network 1006 and/or a wireless carrier system that can be implemented using various data processing equipment, communication towers (e.g. cell towers), etc. In some embodiments, the network 1005 may be an L2 or an L3 network. The network 1005 may carry communications (e.g., data, message, packets, frames, etc.) between any one of the computing devices 1001, 1002, 1003, 1004, and/or 1005. Each of 1001, 1002, 1003, 1004, and/or 1005 may include hardware components as illustrated in FIG. 8 (e.g. processing device 1002 (e.g., processors, central processing units (CPUs), memory 1004 (e.g., random access memory (e.g., RAM), storage devices (e.g., hard-disk drive (HDD), solid-state drive (SSD), etc.), data storage device 918, and other hardware devices (e.g., sound card, video card, etc.). Each of 1001, 1002, 1003, 1004, and/or 910 may include a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Data storage device 1007 may be configured for long-term storage of data and may retain data between power on/off cycles of the computing device 1005.

Each computing device may comprise any suitable type of computing device or machine that has a programmable processor including, for example, server computers, desktop computers, laptop computers, tablet computers, smartphones, set-top boxes, etc. In some examples, each of the computing devices 1002, 1003, 1004, and/or 912 may comprise a single machine or may include multiple interconnected machines (e.g., multiple servers configured in a cluster). The computing devices 1002, 1003, 1004, 912 may be implemented by a common entity/organization or may be implemented by different entities/organizations. For example, computing device 1002 may be operated by a first company/corporation and computing device 1003 may be operated by a second company/corporation. Each of computing devices 1002, 1003, and/or 1004 may execute or include an operating system (OS) such as host OS. The host OS of a computing device 1002, 1003, 1004, and/or 112 may manage the execution of other components (e.g., software, applications, etc.) and/or may manage access to the hardware (e.g., processors, memory, storage devices etc.) of that computing device.

Unless specifically stated otherwise, terms such as "receiving," "generating," "selecting," "determining," "anonymizing," "constructing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A computer-implemented method comprising:
sending, to a vault device:
source code; and
signing key comprising developer credentials;
receiving, from the vault device:
a signed commit of the source code; and
a commit signature for the source code, wherein the commit signature for the source code is independent of the signing key; and
pushing, to a repository, the signed commit of the source code and the commit signature for the source code.

2. The computer-implemented method of claim 1, wherein the source code is one of a programming file, build file, header file, image file, or audio/visual file.

3. The computer-implemented method of claim 1, wherein the signed commit includes the source code and a cryptographic signature of the source code.

4. The computer-implemented method of claim 1, wherein the vault device signs the source code.

5. The computer-implemented method of claim 1, wherein:
the vault device signs the source code using a second signing key; and
the second signing key remains resident on the vault device.

6. The computer-implemented method of claim 5, wherein the vault device generates the second signing key for a developer when the developer is not associated with a second signing key.

7. The computer-implemented method of claim 5, wherein the second signing key, generated by the vault device, identifies a developer.

8. The computer-implemented method of claim 5, wherein the second signing key is rotated on a schedule.

9. The computer-implemented method of claim 1, wherein the vault device receives the source code and the signing key comprising developer credentials from a client device, and the client device is a device used by a developer to edit the source code.

10. The computer-implemented method of claim 1, wherein the vault device is a device that is used to generate and store a second signing key.

11. The computer-implemented method of claim 1, wherein the repository stores the source code after a commit.

12. A computer-implemented method comprising:
receiving, at a repository, a pull request for source code; and
performing a verification by:
sending, to a vault device, a stored commit signature for the source code, wherein:
the vault device retrieves a username associated with the stored commit signature for the source code and;
verifies the stored commit signature by computing a local commit signature for the source code using:
a locally stored first signing key associated with the username; and
a second signing key used by the username to submit the source code to the repository; and
receiving a verification status for the source code.

13. The computer-implemented method of claim 12, further comprising returning the verification status to a device that sent the pull request.

14. The computer-implemented method of claim 12, further comprising blocking a branch merge when the verification status indicates that the stored commit signature is different from the locally computed commit signature.

15. The computer-implemented method of claim 12, further comprising invoking a build server to run a verification action.

16. The computer-implemented method of claim 12, wherein a source code is one of a programming file, build file, header file, image file, or audio/visual file.

17. A system comprising:
a vault device; and
a client device, operatively coupled to the vault device, to:
send to the vault device:
source code; and
a signing key comprising developer credentials;
receive, from the vault device:
a signed commit of the source code; and
a commit signature for the source code, wherein the commit signature for the source code is independent of the signing key; and
push, to a repository, the signed commit of the source code and the commit signature for the source code.

18. The system of claim 17, wherein the source code is one of a programming file, build file, header file, image file, or audio/visual file.

19. The system of claim 17, wherein the signed commit comprises:
source code; and
a cryptographic signature.

20. The system of claim 17, wherein the vault device signs the source code.

21. The system of claim 17, wherein:
the vault device signs the source code using a second signing key; and
the second signing key remains resident on the vault device.

22. The system of claim 21, wherein the vault device generates the second signing key for a developer when the developer is not associated with a second signing key.

23. The system of claim 21, wherein the second signing key, generated by the vault device, identifies a developer.

24. The system of claim 17, wherein the client device is a device used by a developer to edit the source code.

25. A non-transitory machine-readable medium storing instructions which, when executed by one or more processors of a computing device, cause the one or more processors to:
send, to a vault device:
source code; and
a signing key comprising developer credentials;
receive, from the vault device:
a signed commit of the source code; and
a commit signature for the source code, wherein the commit signature is independent of the signing key; and
push, to a repository, the signed commit of the source code and the commit signature for the source code.

* * * * *